R. T. VAN VALKENBURG.
TRANSMISSION MECHANISM.
APPLICATION FILED MAY 27, 1912.
1,052,772.
Patented Feb. 11, 1913.
2 SHEETS—SHEET 1.
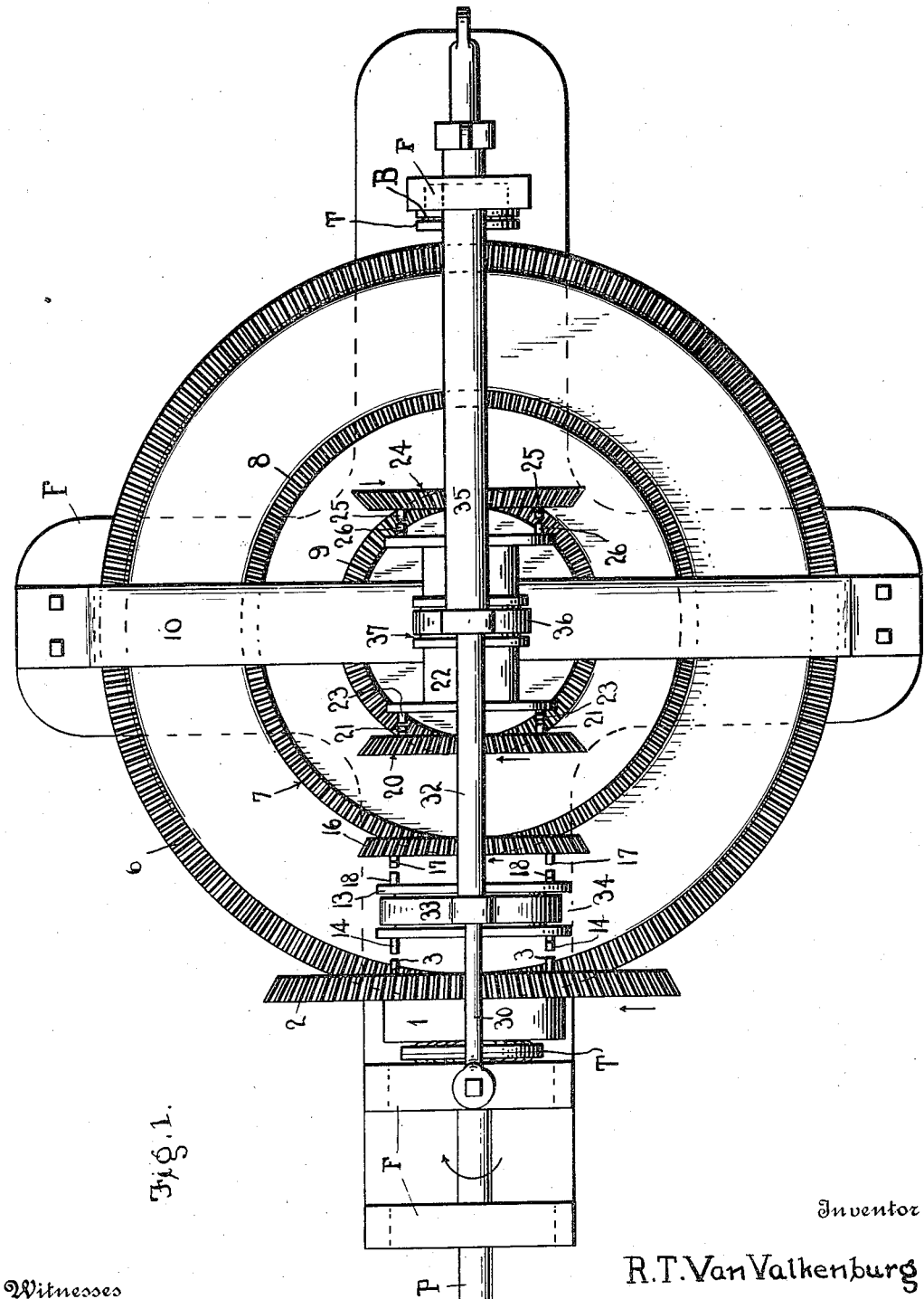
Fig. 1.
Witnesses
L. B. James
N. L. Collamer
Inventor
R. T. Van Valkenburg
Attorneys

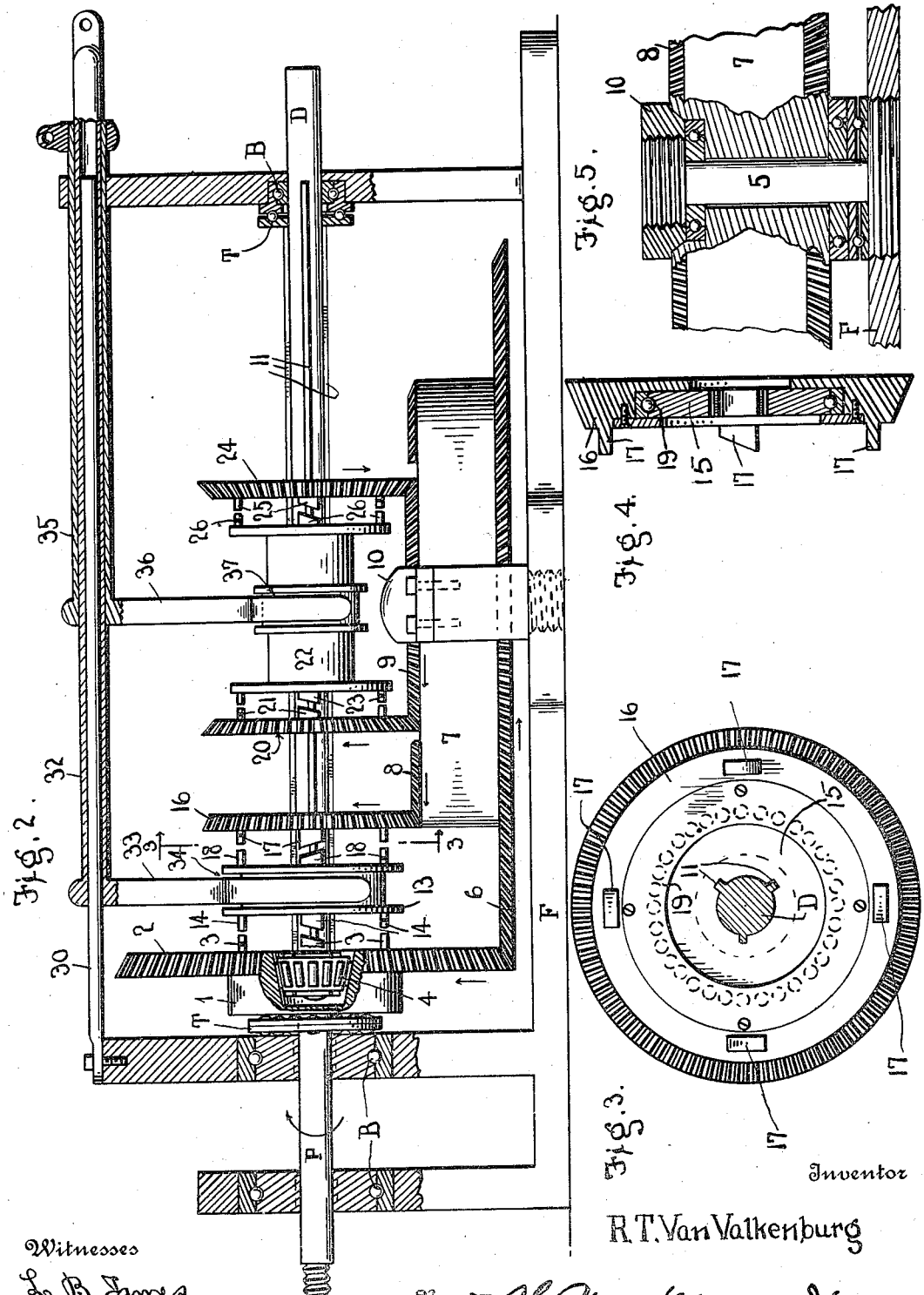

UNITED STATES PATENT OFFICE.

RANDALL T. VAN VALKENBURG, OF HAGERSTOWN, MARYLAND.

TRANSMISSION MECHANISM.

1,052,772.   Specification of Letters Patent.   Patented Feb. 11, 1913.

Application filed May 27, 1912. Serial No. 700,005.

*To all whom it may concern:*

Be it known that I, RANDALL T. VAN VALKENBURG, a citizen of the United States, residing at Hagerstown, in the county of Washington and State of Maryland, have invented certain new and useful Improvements in Transmission Mechanism; and I do declare the following to be a full, clear, and exact description of the invention, such as will enable others skilled in the art to which it appertains to make and use the same.

This invention relates to machine elements, and more especially to gearing; and the object of the same is to produce an improved transmission mechanism for automobiles and the like which is extremely compact and its parts accessible, and which has provision for three speeds forward and one reverse. This and other objects are accomplished by constructing the transmission mechanism in the manner hereinafter more fully described and claimed, and as shown in the drawings, wherein—

Figure 1 is a plan view of this transmission mechanism complete, and Fig. 2 is a side elevation with the cup-shaped hub and some of the bearings in section; Fig. 3 is a cross section on the line 3—3 of Fig. 2, showing one of the gear members, and Fig. 4 is a central vertical section through Fig. 3; Fig. 5 is an enlarged central section through the stud or pin on which the counter gear is mounted, showing the bearings for holding the latter in place.

Referring to the drawings herewith, the letter F designates the frame or box in which this mechanism is contained, P is the power shaft, D the driven shaft, B are ball bearings of any suitable type in which the various parts are mounted, and T are thrust bearings located at points where they are needed. These parts are all well known, and no detailed description thereof is necessary.

Coming now more particularly to the present invention, the power shaft P which is driven by the engine (not shown) has a cup-shaped hub 1 secured around its rear end and carrying a power gear 2 of some considerable size as shown and provided on its rear face with clutch teeth 3; and within said cup-shaped hub 1 is disposed a roller bearing 4 between the front end of the driven shaft D and the walls of said hub. Rising from the bottom of the box or frame F is a stud or pin 5 on which, through suitable bearings, is mounted a counter gear or member having a peripheral ring of teeth 6 engaged with those in the power gear 2 so that this member is rotated constantly, and a hub 7 itself having an outer and an inner ring of teeth 8 and 9 for a purpose to be described below. The upper end of the pin 5 is by preference braced within the frame F by means of a cross strap 10 which stands above the toothed rings 8 and 9 as shown, and thereby the counter member is very firmly held in mesh with the power gear 2, and it is rotated constantly while the engine runs, in a manner well known in devices of this character.

High speed on the direct drive is obtained as follows: The driven shaft D has a number of ribs 11 along its length, and these are slidably engaged by grooves 12 in the hub of a sliding clutch element 13 having clutch teeth 14 adapted to be engaged with those numbered 3 on the power gear 2 when this element is moved forward, and the connection of the two clutch elements causes the driven shaft D to rotate in the same direction and at the same speed as the power shaft P.

Medium speed forward is obtained as follows: Fast on the driven shaft D is a hub 15 of a gear ring 16 from which project clutch teeth 17 adapted to be engaged with others numbered 18 on the rear side of the clutch element 13, when the latter is moved to the rear; but the hub 15 and ring 16 are separated by a ball bearing 19 of any suitable construction, and this member is preferably formed as best seen in Fig. 4. It follows that the constant rotation of the counter member causes its toothed ring 8 to engage the gear ring 16 which is rotated around the ball bearing 19 between the ring 16 and its own hub 15, and this rotation of the ring 16 continues whatever the direction in which its hub 15 rotates, and whatever its speed. In other words, excepting for the ball bearings, the members 15 and 16 are perfectly separate although the innermost carries the outermost. The relative sizes of the gear ring 8 and the gear ring 16 regulates the speed at which the driven shaft D will be rotated by the power shaft P when on "medium speed" as thus explained.

Low speed forward is obtained as follows: The construction just described with respect to second speed is duplicated a little farther back on the driven shaft D as at 20, excepting that the clutch teeth 21 on the gear ring of this element project to the rear. The gear teeth on this element, by reason of the fact that they engage with the smaller gear ring 9 on the counter member, cause slower rotation and greater power in a manner well known in this line. Slidably mounted on the driven shaft D just in rear of the member 20 is a clutch element which takes the form of a sleeve or spool 22 having clutch teeth 23 on its front end adapted to engage with those numbered 21 on the element 20; and it is obvious that when these members engage, the power will be communicated from the shaft P through the power gear 2, the counter member and its ring 9, the ring or annulus of the member 20, the teeth 21 and 23, to the sleeve 22, and by the latter to the driven shaft D.

Low speed in a reverse direction is obtained as follows: The construction just described in reference to low speed forward is duplicated to the rear of the clutch element or sleeve 22, as shown at 24, and the teeth 25 on this member are adapted to be placed in engagement with the teeth 26 on the rear end of the sleeve. However, the member 25 engages the rear side of the ring 9 on the counter member, and is therefore of course rotated in a direction reverse to that in which the member 20 rotates. It will be obvious to those familiar with devices of this kind, that when the sleeve 22 is moved to engage the clutch teeth 26 and 25, power is communicated from the main shaft P through the power gear 2, the counter member and its gear ring 9, the element 24, and the teeth 25 and 26 to the sleeve 22, and by the latter to the driven shaft D which rotates in a direction the reverse to that in which the power shaft P is rotating.

The shifting mechanism by means of which the various speeds are controlled is constructed as follows: The numeral 30 designates a rod secured within the box or frame F and preferably along the top thereof opposite to the counter member above described, and 32 is a piece of tubing slidably mounted on this rod and carrying at one end a fork 33 which engages a groove 34 formed in the periphery of the clutch element 13. The numeral 35 designates a piece of larger tubing slidably mounted upon the smaller tubing 32, and carrying at one end a fork 36 loosely engaging an annular groove 37 formed in the periphery of the clutch element or sleeve 22. The smaller tube 32 is moved upon the rod 30, or the larger tube 35 upon the smaller tube 32, by means not necessary to describe or to show in this connection, as they form no part of the present invention. But it is obvious that provision must be made whereby only one pair of the clutch teeth throughout the entire transmission mechanism may be engaged at a time, and this may be carried out in any of the ways well known in transmission mechanism.

The parts are all by preference of metal, tempered where necessary to produce strength and resist wear; and, as suggested above, ball, roller, and thrust bearings are used at the points shown and elsewhere if found necessary to reduce friction.

This transmission mechanism has the merit of being extremely compact and simple, its parts are all readily accessible when the cover of the box-like frame F is removed, and its various gear members and clutch members are mounted upon a single line of shafting, if we except the stud or pin 5 carrying the counter element which by preference lies in the bottom of the frame or box so that it is bathed in grease.

What is claimed as new is:

1. In a transmission mechanism, the combination with alined power and driven shafts, and the power gear having a hub fast on the power shaft; of a counter member pivoted on an axis at an angle to the line of said shafts, a plurality of gear rings on this member, one of which engages with said power gear, gear rings rotatable around the driven shaft and in mesh with the remaining rings on said counter member, each of the driven gear rings having clutch members, clutch elements splined on said driven shaft and having clutch members adapted to be engaged with those on the driven rings, and means for shifting said elements.

2. In a transmission mechanism, the combination with alined power and driven shafts, the power gear having a cup-shaped hub fast on the power shaft, and bearings between the adjacent end of the driven shaft and said hub; of a counter member pivoted on an axis at an angle to the line of said shafts, a plurality of gear rings on this member, one of which engages with said power gear, gear rings rotatable around the driven shaft and in mesh with the remaining rings on said counter member, each of the driven gear rings having clutch teeth, clutch elements splined on said driven shaft and having teeth adapted to be thrown into engagement with those on the driven rings, and means for shifting said elements independently.

3. In a transmission mechanism, the combination with separate power and driven shafts extending in one direction, a frame in which they are journaled, and a power gear fast on the power shaft and having clutch teeth; of a counter member pivoted on an axis at right angles to the line of said shafts and having a plurality of gear rings, one of which engages with said power gear, gear rings rotatable around the driven shaft and in mesh with the remaining rings on said counter member, one of them being in rear of its pivot, each of the driven gear rings having clutch teeth, clutch elements splined on said driven shaft and having teeth adapted to be thrown into engagement with those on the driven rings, and means for shifting said elements independently.

4. In a transmission mechanism, the combination with separate power and driven shafts extending in one direction, a frame in which they are journaled, and a power gear fast on the power shaft and having clutch teeth; of a counter member pivoted on an axis at right angles to the line of said shafts and having a plurality of bevel gear rings, one of which engages with said power gear, gear rings rotatable around the driven shaft and in mesh with the remaining bevel rings on said counter member, each of the driven gear rings having clutch teeth, clutch elements splined on said driven shaft and having teeth adapted to be thrown into engagement with those on the driven rings, one of said elements standing between the power gear and one of said gear rings, and means for shifting said elements independently.

5. In a transmission mechanism, the combination with alined power and driven shafts, the power gear having a cup-shaped hub fast on the power shaft, and bearings between the adjacent end of the driven shaft and said hub; of a counter member pivoted on an axis at an angle to the line of said shafts and having a plurality of gear rings, one of which engages with said power gear, a plurality of gear elements each comprising a hub fast on the driven shaft and a gear ring rotatable around its hub and having clutch teeth, the several gear rings being in mesh with those on the counter member, clutch elements splined on said driven shaft and having teeth adapted to be thrown into engagement with those on the driven rings, and means for shifting said clutch elements.

6. In a transmission mechanism, the combination with separate power and driven shafts extending in one direction, a frame in which they are journaled, and a bevel power gear fast on the power shaft and having clutch teeth; of a counter member pivoted on an axis at right angles to the line of said shafts and having a plurality of bevel gear rings, one of which engages with said power gear, a plurality of gear elements each comprising a hub fast on the driven shaft and a ring rotatable around the hub and having beveled gear teeth engaging those on one of the rings in said counter member, ball bearings between the hub and ring, the ring also having clutch teeth on that face adjacent the inner ends of its teeth; clutch elements splined on said driven shaft and having teeth adapted to be thrown into engagement with those on the driven rings, one of said elements standing between the power gear and one of said gear rings, and means for shifting said elements independently.

7. In a transmission mechanism, the combination with a box-like casing having a pin rising from its bottom, cross straps bracing this pin from the sides of the casing, bearings in the front and rear ends of the latter, the driving shaft projecting through the forward bearing, and the driven shaft projecting through the rearmost bearing and having ribs throughout its length within the casing; of a power gear fast on the rear end of the power shaft, a counter member journaled on said pin and carrying a number of gear rings, one of which engages the teeth on the power gear, a plurality of driven elements each having a hub fast on the driven shaft and a gear ring rotatably mounted around the hub and in constant mesh with one of the rings on said counter element, and means for independently and selectively connecting said rings with the driven shaft.

8. In a transmission mechanism, the combination with a box-like casing having a pin rising from its bottom, the driving shaft projecting through its forward end, and the driven shaft projecting through its rearmost end and having ribs throughout its length within the casing; of a power gear fast on the rear end of the power shaft, a counter member journaled on said pin and carrying a number of gear rings, one of which engages the teeth on the power gear, a plurality of driven elements each comprising a hub fast on the driven shaft and a gear ring rotatable around its hub and in constant mesh with one of the gear rings on said counter element, one of such gear elements being in rear of the pivot of said counter element for the purpose set forth, and means for independently and selectively connecting said rings with the driven shaft.

9. In a transmission mechanism, the combination with the power and driven shafts in alinement with each other, the power gear on the power shaft, a plurality of driven gear elements on the driven shaft and having clutch teeth, clutch elements slidable on this shaft for connecting the gear elements with it, each clutch element having an annular groove, and a counter member connecting the power gear with the various gear elements; of a fixed rod parallel with said shafts, a tube slidable on this rod, a fork carried by this tube and engaging the groove in one of said clutch elements, a second tube slidable on the first tube, and a fork on the second tube engaging a groove in the other clutch element, said tubes being capable of independent movement, as and for the purpose set forth.

In testimony whereof I have hereunto set my hand in presence of two subscribing witnesses.

RANDALL T. VAN VALKENBURG.

Witnesses:
L. O. HILTON,
M. I. BUSSIUS.